United States Patent
Kang

Patent Number: 6,128,343
Date of Patent: Oct. 3, 2000

[54] APPARATUS AND METHOD FOR CONVERTING VIDEO SIGNAL IN SCANNING LINE ORDER

[75] Inventor: Byung Joo Kang, Seoul, Rep. of Korea

[73] Assignee: Hyundai Electronics Industries Co., Ltd., Kyoungki-do, Rep. of Korea

[21] Appl. No.: 09/006,285

[22] Filed: Jan. 13, 1998

[30] Foreign Application Priority Data

May 10, 1997 [KR] Rep. of Korea ...................... 97-18093

[51] Int. Cl.⁷ .................................................. H04N 7/24
[52] U.S. Cl. ..................... 375/240.01; 348/458
[58] Field of Search ..................... 348/206, 384, 348/423, 426, 440, 441, 443, 444, 445, 450, 458; 375/240, 240.01, 240.26

[56] References Cited

U.S. PATENT DOCUMENTS

| | | | |
|---|---|---|---|
| 5,231,490 | 7/1993 | Park | 348/445 |
| 5,623,308 | 4/1997 | Civanlar | 348/423 |
| 5,835,636 | 11/1998 | Auld | 348/714 |
| 5,999,220 | 12/1999 | Washino | 348/441 |

*Primary Examiner*—Bryan Tung
*Attorney, Agent, or Firm*—Merchant & Gould P.C.

[57] ABSTRACT

An apparatus and a method for converting a video signal in the scanning line order. The video signal conversion apparatus comprises a video signal converter including an address control circuit for performing an address control operation in response to a synchronous signal and a first clock signal, a luminance signal memory unit for storing and outputting first to fourth luminance signal components of the video data under the control of the address control circuit, a color signal memory unit for storing and outputting first and second color signal components of the video data under the control of the address control circuit, a multiplexing circuit for multiplexing the first to fourth luminance signal components outputted from the luminance signal memory unit, an interpolator for delaying the first and second color signal components outputted from the color signal memory unit for a predetermined time period, first and second D flip-flops for buffering fifth and sixth luminance signal components outputted from the multiplexing circuit, respectively, and a digital interface unit for interfacing the fifth and sixth luminance signal components buffered respectively by the first and second D flip-flops with the first and second color signal components delayed by the interpolator in response to a second clock signal.

16 Claims, 12 Drawing Sheets

FIG. 1a frame of luminance signal

FIG. 1b frame of color signal

FIG. 1c macro block

FIG. 1d block and word of luminance signal

FIG. 1e block of color signal

APPARATUS AND METHOD FOR CONVERTING VIDEO SIGNAL IN SCANNING LINE ORDER

BACKGROUND OF THE INVENTION

1. Field of the Invention

The present invention relates in general to the conversion of a video signal, and more particularly to an apparatus and a method for converting a video signal in the scanning line order, in which the output order of motion-compensated (block-unit decoded) digital video data is rearranged into the display order so that it can be outputted to a screen.

2. Description of the Prior Art

In a conventional digital video signal processing system, decoded video data cannot be scanned directly on a cathode ray tube (referred to hereinafter as CRT). For this reason, separate hardware must be configured for the conversion of video data in the scanning line order.

Also in the conventional digital video signal processing system, a large amount of data is required to process a video signal in a digital manner. As a result, hardware must be realized by a data compression, parallel process, etc., resulting in a difficulty in realization.

An example of such a conventional digital video signal processing system is shown in U.S. Pat. No. 5,231,490. This patent relates to an apparatus for converting an aspect ratio and the number of scanning lines of a video signal. This conversion apparatus is adapted to convert a received HDTV video signal with a 16:9 aspect ratio and at least 1050 scanning lines into an NTSC TV video signal of a zoom-up mode with 525 scanning lines and a 3:4 aspect ratio or a wide mode where 375 lines are converted in the center of a picture screen to maintain the 16:9 aspect ratio. To this end, the conversion apparatus comprises an input latch, a field memory, and an output latch. Further, the conversion apparatus comprises input control means for controlling the input latch and the field memory to write the HDTV video signal from the input latch into the field memory, and output control means for controlling the field memory and the output latch to convert the HDTV video signal written into the field memory into the NTSC TV video signal by selecting a desired one of plural modes (mode 1 through mode N) corresponding to an aspect ratio and the number of scanning lines of the NTSC TV video signal to be converted. The input control means includes an HDTV horizontal line start signal generator, first and second address generators, HDTV horizontal and vertical control signal generation read only memories (referred to hereinafter as ROMs), and three logic executors. The output control means includes a signal selector, an NTSC TV horizontal line start signal generator, third and fourth address generators, NTSC TV horizontal and vertical control signal generation ROMs, and fourth and fifth logic executors.

In the above patent, the conversion apparatus is adapted to convert an aspect ratio and the number of scanning lines of a received HDTV video signal for converting the received HDTV video signal into a video signal which can be watched through the present NTSC standard TV set. This conversion apparatus has been proposed to overcome a conventional problem that, if the number of conversion modes is more than two, a hardware configuration of write and read control circuits for a video memory is increased in proportion to the preferred number of conversion modes. Namely, the above conversion apparatus converts the aspect ratio and the number of scanning lines into more than two modes by means of configuration simpler than that in the prior art. Therefore, the cost of production can be reduced and the function can be more versatile.

However, the above-mentioned conversion apparatus is applicable to a system where an input video signal format and a display format are different from each other, but has the disadvantage that it cannot display decoded video data directly on the CRT.

SUMMARY OF THE INVENTION

Therefore, the present invention has been made in view of the above problem, and it is an object of the present invention to provide an apparatus and a method for converting a video signal in the scanning line order, in which decoded video data, which cannot be scanned directly on a CRT, is converted in the scanning line order so that it can be displayed on the CRT, and every four pixels are processed in a parallel manner at a time so that hardware can be simply designed and readily configured.

In accordance with one aspect of the present invention, there is provided an apparatus for converting a video signal in the scanning line order, comprising video signal conversion means for converting decoded video data to scan it directly on a CRT; frame rate conversion means for converting a frame rate of output data from the video signal conversion means in response to syntax data indicative of a vertical size, horizontal size, frame rate code and scanning format of the video data required by the MPEG2; and interface means for performing an interfacing operation with respect to output data from the frame rate conversion means.

In accordance with another aspect of the present invention, there is provided a method for converting a video signal in the scanning line order, comprising the first step of storing luminance and color signals of decoded video data into luminance and color signal memory units, respectively; the second step of parallel-multiplexing the luminance signal from the luminance signal memory unit; the third step of parallel-latching the color signal from the color signal memory unit; and the fourth step of interfacing the multiplexed luminance signal with the multiplexed color signal to scan the video data on a CRT in the scanning line order.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 3:
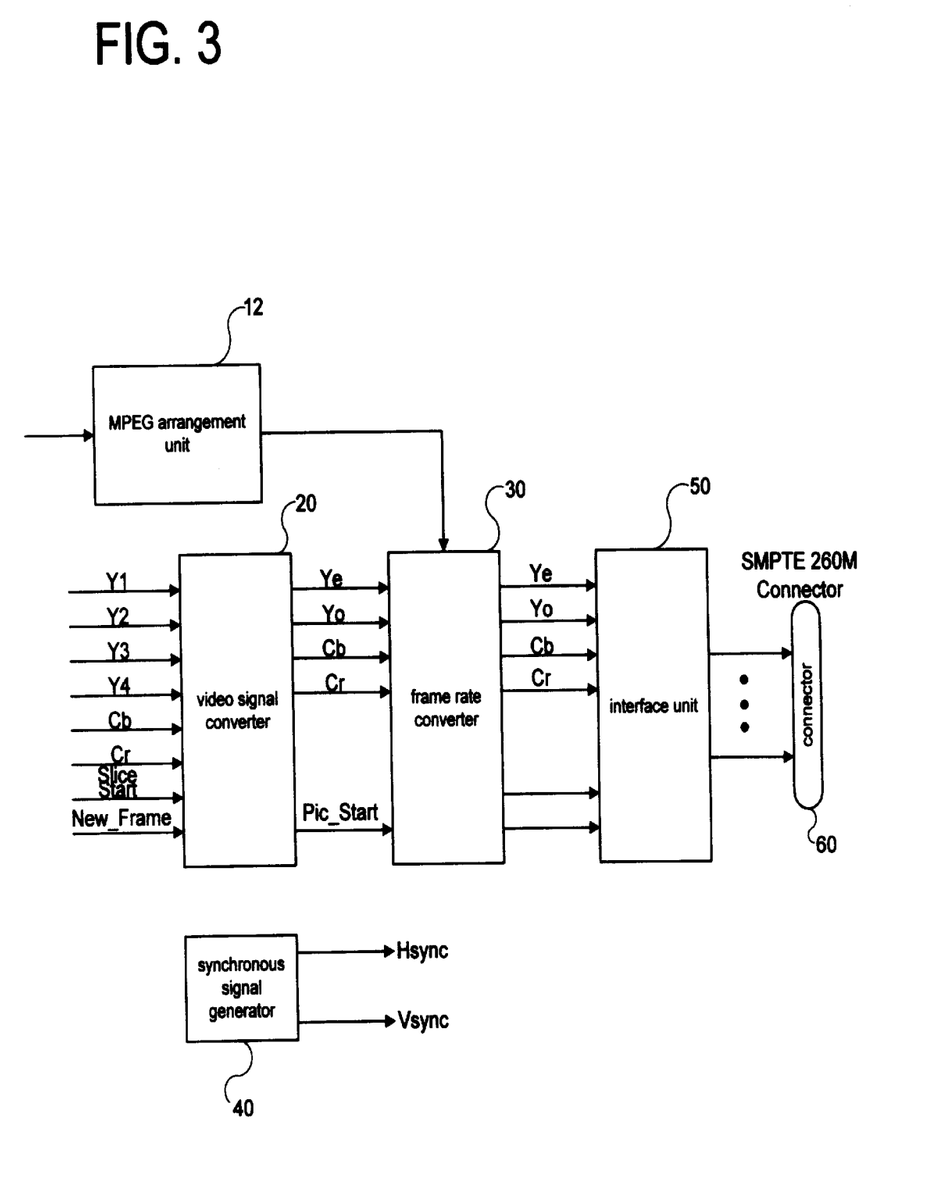
FIG. 3 is a block diagram of an apparatus for converting a video signal in the scanning line order in accordance with the present invention.

FIG. 3 is a block diagram of an apparatus for converting a video signal in the scanning line order in accordance with the present invention. As shown in this drawing, the video signal conversion apparatus comprises a video signal converter 20 for parallel-processing decoded video data in the unit of four pixels at 33 MHz to scan it directly on a CRT, a frame rate converter 30 for converting a frame rate of output data from the video signal converter 20 into 37 MHz in response to syntax data indicative of a vertical size, horizontal size, frame rate code and scanning format of the video data required by the MPEG, an interface unit 50 for converting a processing speed of output data from the frame rate converter 30 into 260 MHz, and a connector 60 for transferring output data from the interface unit 50 externally. A synchronous signal generator 40 is adapted to generate horizontal and vertical synchronous signals Hsync and Vsync.

Figure 4:
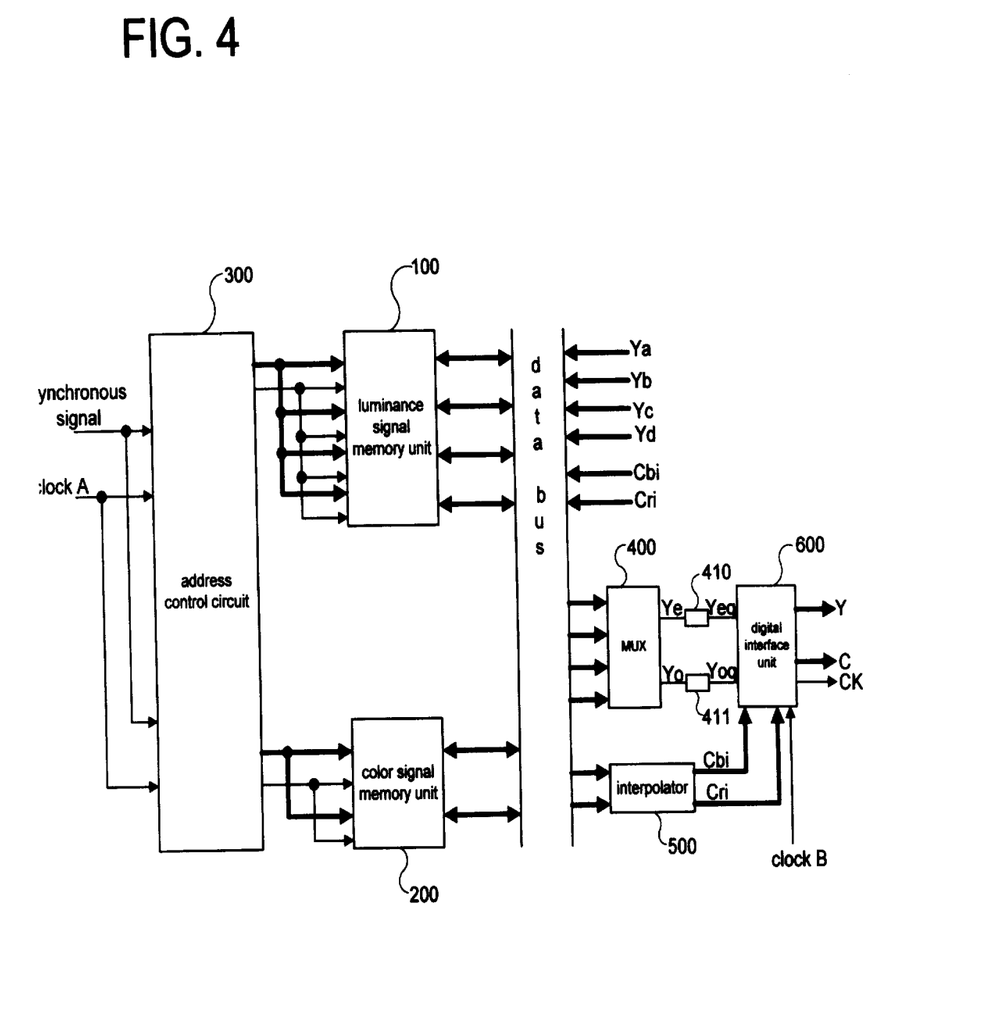
FIG. 4 is a block diagram of a video signal converter in FIG. 3.

FIG. 4 is a block diagram of the video signal converter 20 in FIG. 3. As shown in this drawing, the video signal converter 20 comprises an address control circuit 300 for performing an address control operation in response to a synchronous signal and an external clock signal A, a luminance signal memory unit 100 for storing and outputting luminance signal components Ya, Yb, Yc and Yd of the video data under the control of the address control circuit 300, and a color signal memory unit 200 for storing and outputting color signal components Cbi and Cri of the video data under the control of the address control circuit 300.

The video signal converter 20 further comprises a multiplexing circuit 400 for multiplexing the luminance signal components Ya, Yb, Yc and Yd outputted from the luminance signal memory unit 100, an interpolator 500 for delaying the color signal components Cbi and Cri outputted from the color signal memory unit 200 for a predetermined time period, D flip-flops 410 and 411 for buffering luminance signal components Ye and Yo outputted from the multiplexing circuit 400, respectively, and a digital interface unit 600 for interfacing luminance signal components Yeq and Yoq outputted from the D flip-flops 410 and 411 with the color signal components Cbi and Cri delayed by the interpolator 500 in response to an external clock signal B to output the final luminance signal Y, the final color signal C and the final clock signal CK.

Figure 5:
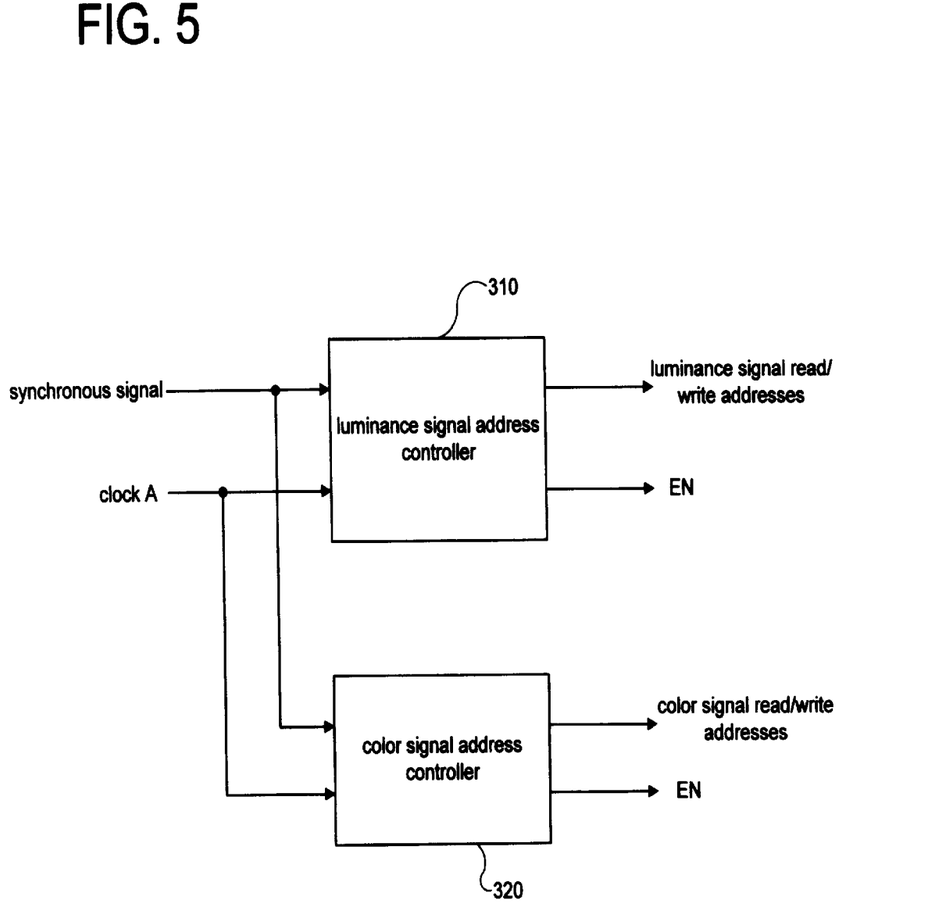
FIG. 5 is a detailed block diagram of an address control circuit in FIG. 4.

FIG. 5 is a detailed block diagram of the address control circuit 300 in FIG. 4. As shown in this drawing, the address control circuit 300 includes a luminance signal address controller 310 for controlling the addressing of the luminance signal memory unit 100 in response to the synchronous signal and the external clock signal A, and a color signal address controller 320 for controlling the addressing of the color signal memory unit 200 in response to the synchronous signal and the external clock signal A.

Figure 6:
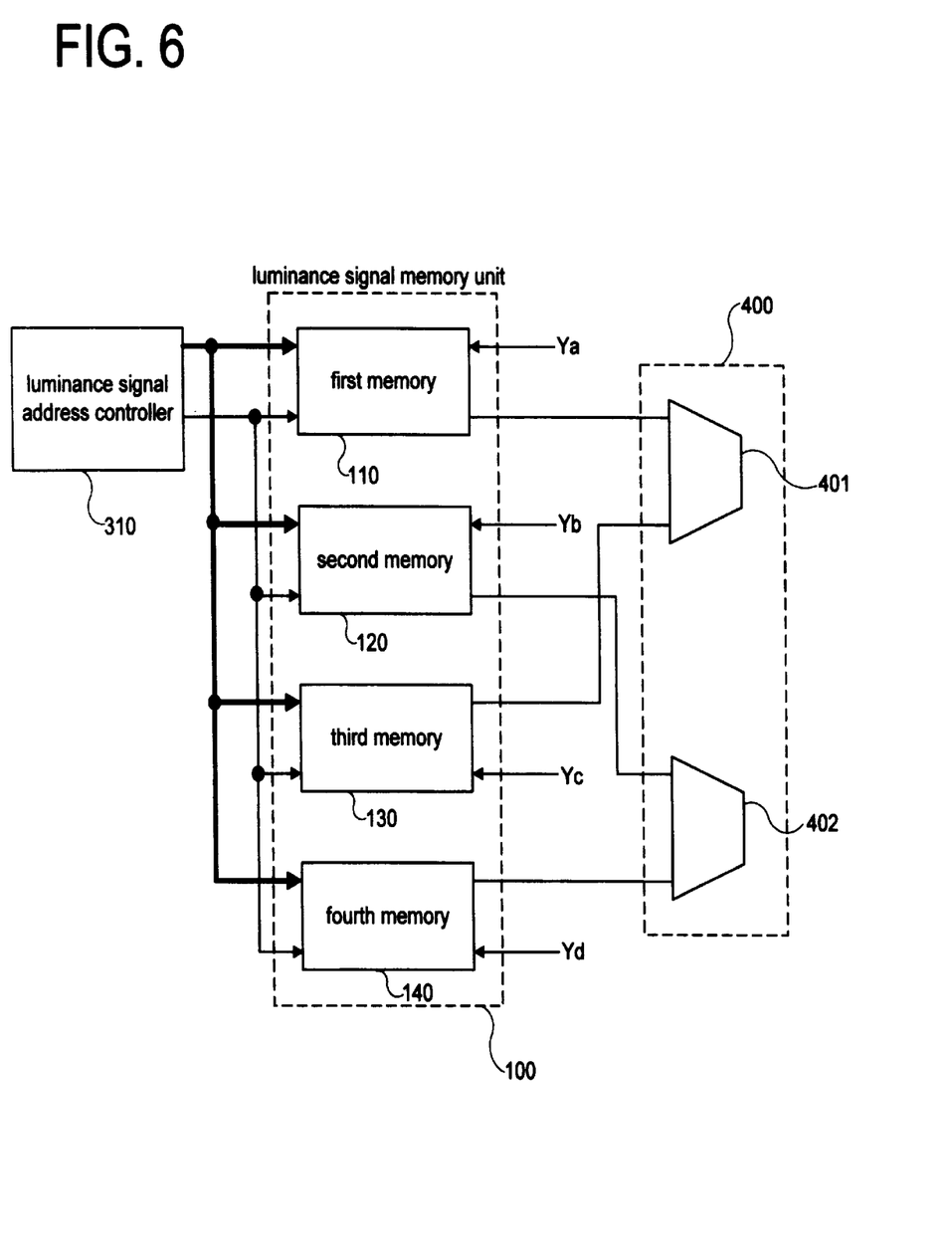
FIG. 6 is a detailed block diagram of a luminance signal memory unit and multiplexing circuit in FIG. 4.

FIG. 6 is a detailed block diagram of the luminance signal memory unit 100 and multiplexing circuit 400 in FIG. 4. As shown in this drawing, the luminance signal memory unit 100 includes a first memory 110 for storing and outputting the luminance signal component Ya under the control of the luminance signal address controller 310, a second memory 120 for storing and outputting the luminance signal component Yb under the control of the luminance signal address controller 310, a third memory 130 for storing and outputting the luminance signal component Yc under the control of the luminance signal address controller 310, and a fourth memory 140 for storing and outputting the luminance signal component Yd under the control of the luminance signal address controller 310.

The multiplexing circuit 400 includes a first multiplexer 401 for multiplexing the luminance signal component Ya outputted from the first memory 110 and the luminance signal component Yc outputted from the third memory 130 to output the luminance signal component Ye, and a second multiplexer 402 for multiplexing the luminance signal component Yb outputted from the second memory 120 and the luminance signal component Yd outputted from the fourth memory 140 to output the luminance signal component Yo.

Figure 7:
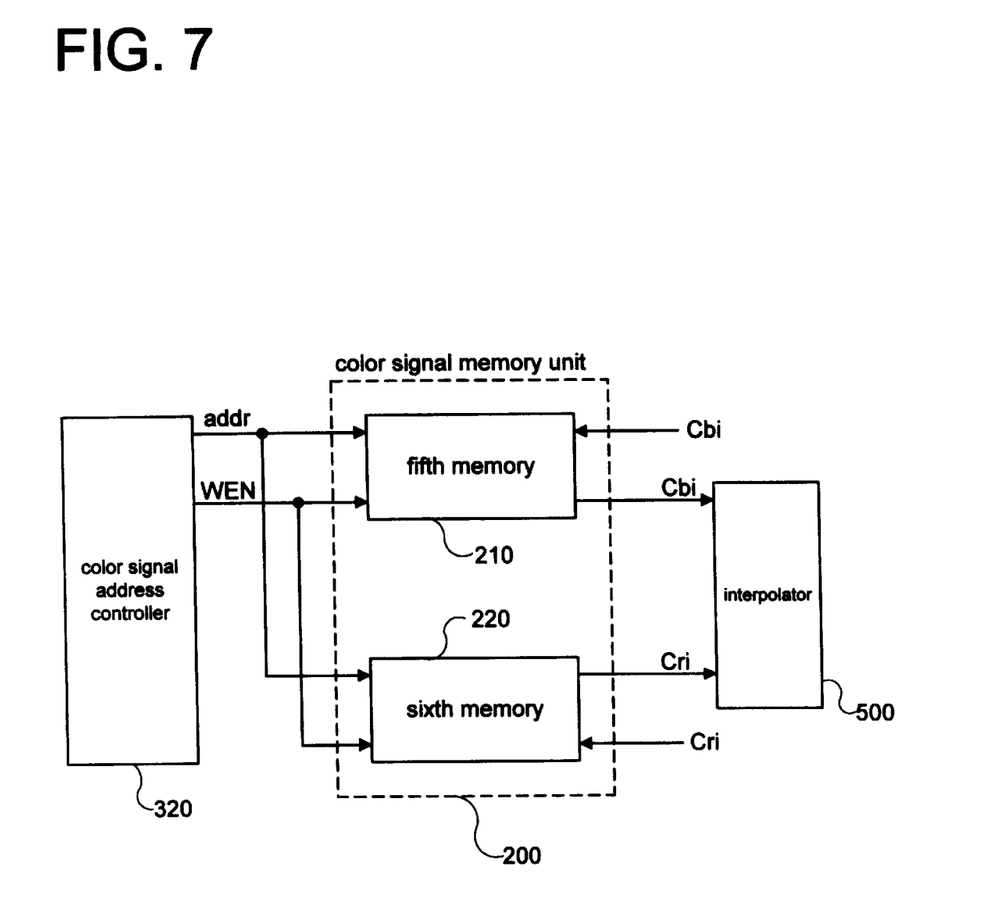
FIG. 7 is a detailed block diagram of a color signal memory unit in FIG. 4.

FIG. 7 is a detailed block diagram of the color signal memory unit 200 in FIG. 4. As shown in this drawing, the color signal memory unit 200 includes a fifth memory 210 for storing and outputting the color signal component Cbi under the control of the color signal address controller 320, and a sixth memory 220 for storing and outputting the color signal component Cri under the control of the color signal address controller 320. The color signal components Cbi and Cri stored in the fifth and sixth memories 210 and 220 are applied to the interpolator 500 in response to a read signal from the color signal address controller 320.

Figure 8:
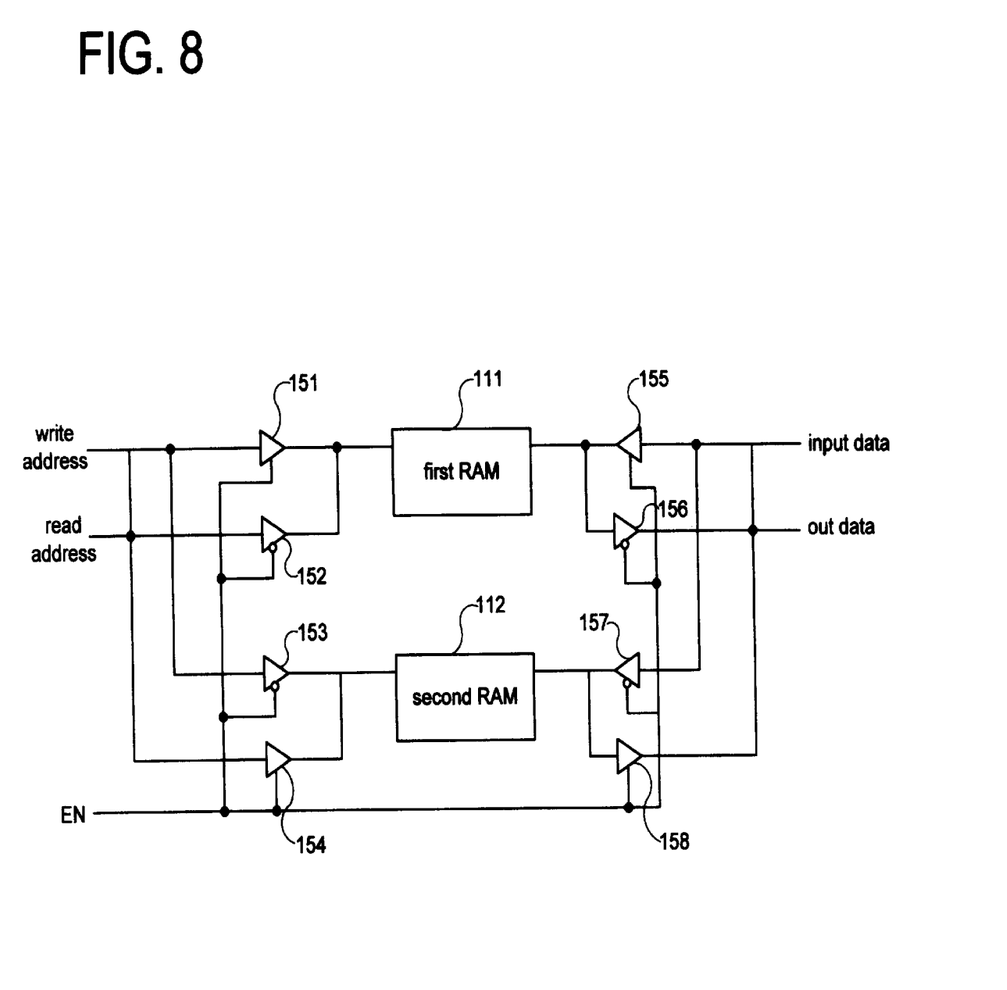
FIG. 8 is a detailed circuit diagram illustrating an embodiment of each of memories in the luminance and color signal memory units in FIGS. 6 and 7.

FIG. 8 is a detail circuit diagram illustrating an embodiment of each of the memories in the luminance and color signal memory units 100 and 200 in FIGS. 6 and 7. As shown in this drawing, each memory includes first and second random access memories (referred to hereinafter as RAMs) 111 and 112 for storing and outputting the corresponding luminance or color signal component of the video data, 3-state gates 151 and 152 for transferring read/write addresses from the luminance or color signal address controller 310 or 320 to the first RAM 111 in response to an enable signal EN from the luminance or color signal address controller 310 or 320, 3-state gates 153 and 154 for transferring the read/write addresses from the luminance or color signal address controller 310 or 320 to the second RAM 112 in response to the enable signal EN, 3-state gates 155 and 156 for controlling data input/output operations of the first RAM 111 in response to the enable signal EN, and 3-state gates 157 and 158 for controlling data input/output operations of the second RAM 112 in response to the enable signal EN.

Figure 9:
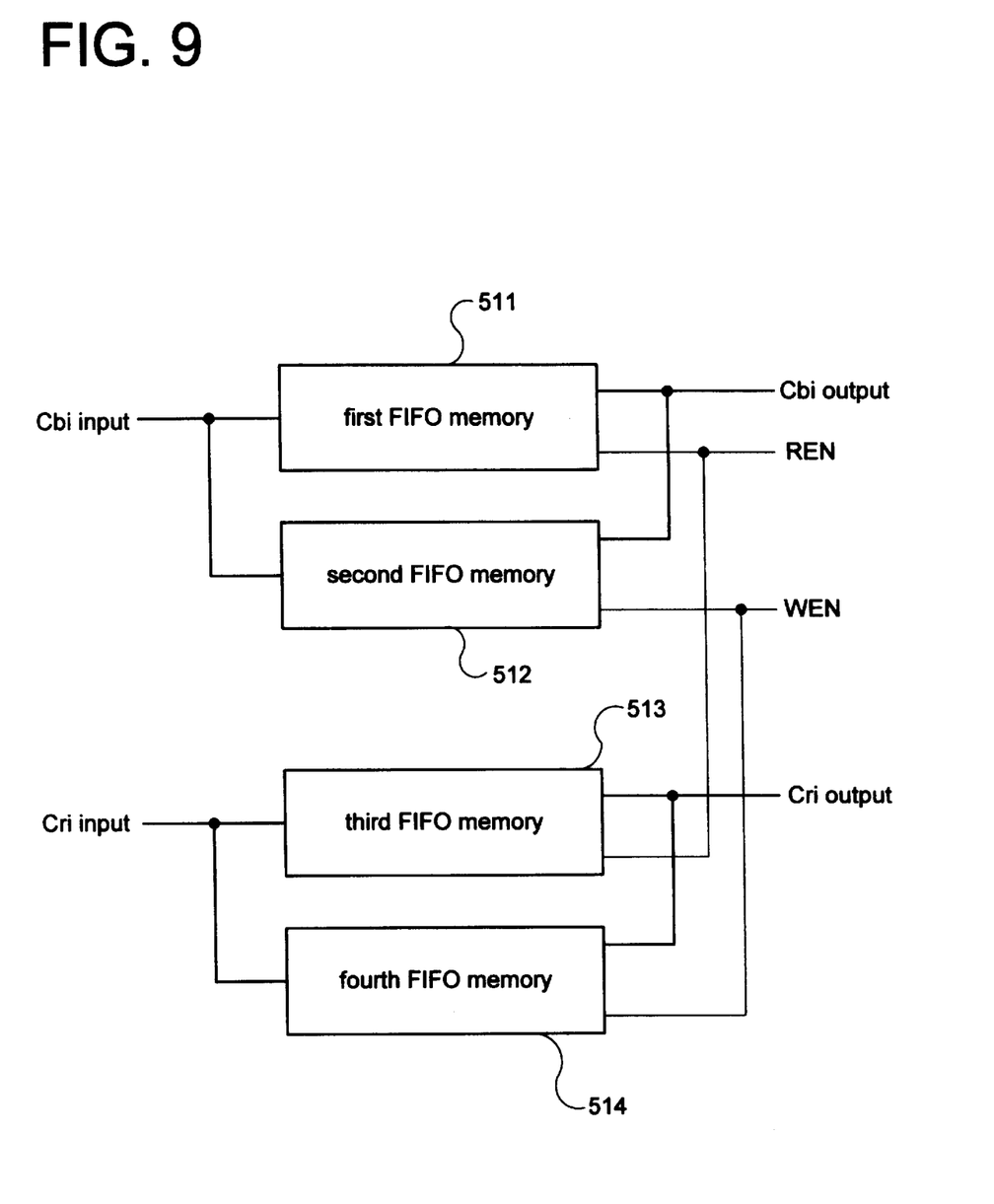
FIG. 9 is a detailed block diagram of an interpolator in FIG. 4.

FIG. 9 is a detailed block diagram of the interpolator 500 in FIG. 4. As shown in this drawing, the interpolator 500 includes a first first-in-first-out (referred to hereinafter as FIFO) memory 511 for outputting the color signal component Cbi from the color signal memory unit 200 in response to a read enable signal REN, a second FIFO memory 512 for storing the color signal component Cbi from the color signal memory unit 200 in response to a write enable signal WEN, a third FIFO memory 513 for outputting the color signal component Cri from the color signal memory unit 200 in response to the read enable signal REN, and a fourth FIFO memory 514 for storing the color signal component Cri from the color signal memory unit 200 in response to the write enable signal WEN.

Figure 10:
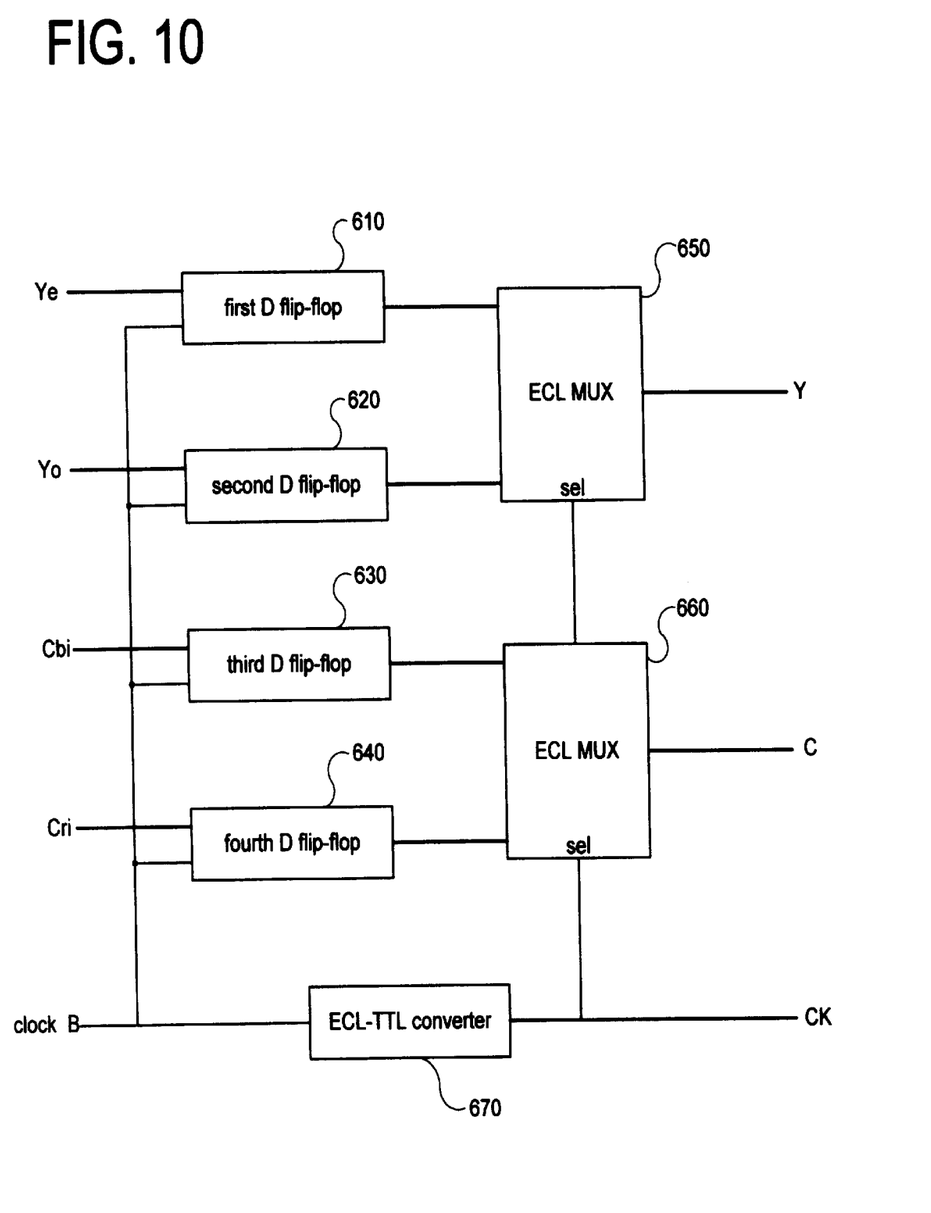
FIG. 10 is a detailed block diagram of a digital interface unit in FIG. 4.

FIG. 10 is a detailed block diagram of the digital interface unit 600 in FIG. 4. As shown in this drawing, the digital interface unit 600 includes a first D flip-flop 610 for delaying the luminance signal component Yeq from the D flip-flop 410 in response to the external clock signal B, a second D flip-flop 620 for delaying the luminance signal component Yoq from the D flip-flop 411 in response to the external clock signal B, a third D flip-flop 630 for delaying the color signal component Cbi from the interpolator 500 in response to the external clock signal B, and a fourth D flip-flop 640 for delaying the color signal component Cri from the interpolator 500 in response to the external clock signal B.

The digital interface unit 600 further includes a first ECL multiplexer 650 for performing TTL/ECL conversion and multiplexing operations with respect to the luminance signal components Yeq and Yoq delayed respectively by the first and second D flip-flops 610 and 620 in response to the final clock signal CK to generate the final luminance signal Y, a second ECL multiplexer 660 for performing TTL/ECL conversion and multiplexing operations with respect to the color signal components Cbi and Cri delayed respectively by the third and fourth D flip-flops 630 and 640 in response to the final clock signal CK to generate the final color signal C, and an ECL/TTL converter 670 for performing an ECL/TTL conversion operation with respect to the external clock signal B to generate the final clock signal CK and applying it to the first and second ECL multiplexers 650 and 660.

Figure 11:
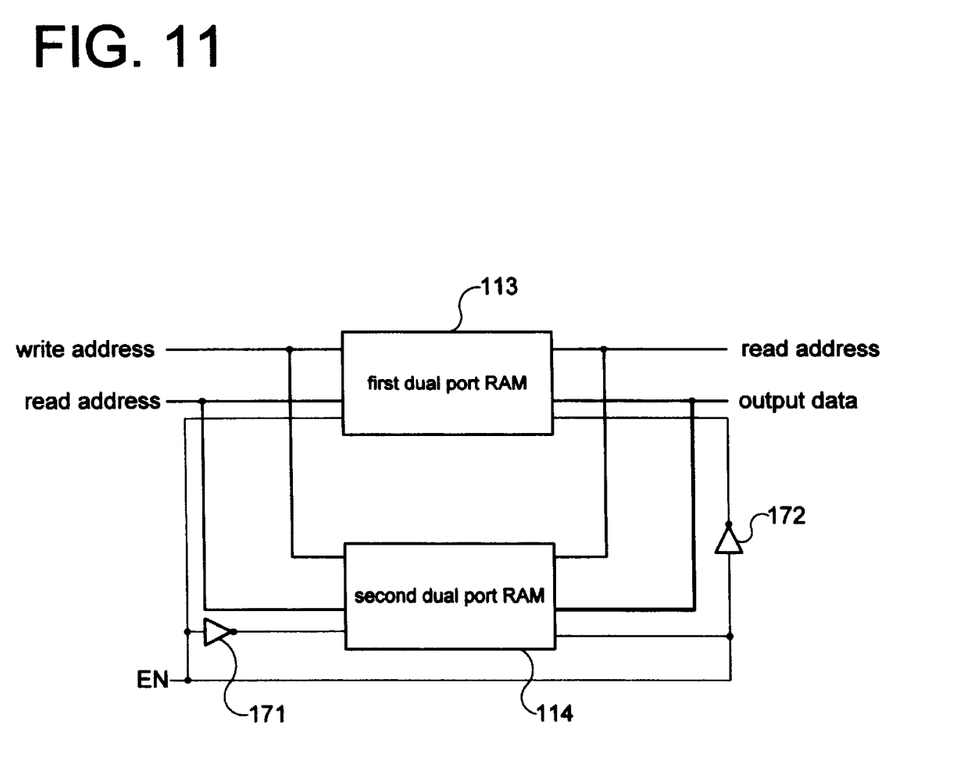
FIG. 11 is a detailed circuit diagram illustrating an alternative embodiment of each of the memories in the luminance and color signal memory units in FIGS. 6 and 7.

FIG. 11 is a detail circuit diagram illustrating an alternative embodiment of each of the memories in the luminance and color signal memory units 100 and 200 in FIGS. 6 and 7. As shown in this drawing, each memory includes first and second dual port RAMs 113 and 114 for storing and outputting the corresponding luminance or color signal component of the video data in response to the write/read addresses and enable signal EN from the luminance or color signal address controller 310 or 320, an inverter 171 for inverting the enable signal EN and outputting the inverted signal to the second dual port RAM 114, and an inverter 172 for inverting the enable signal EN and outputting the inverted signal to the first dual port RAM 113. The first and second dual port RAMs 113 and 114 perform read/write operations in the opposite manner in response to the enable signal EN from the luminance or color signal address controller 310 or 320.

The operation of the video signal conversion apparatus with the above-mentioned construction in accordance with the present invention will hereinafter be described in detail.

Figure 1A:
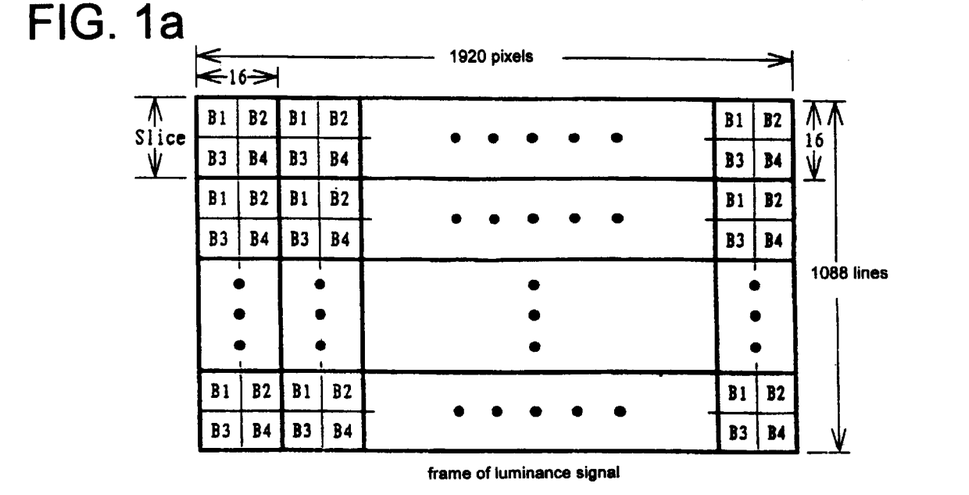
FIGS. 1a to 1e are views illustrating HDTV frame formats.
Figure 1B:
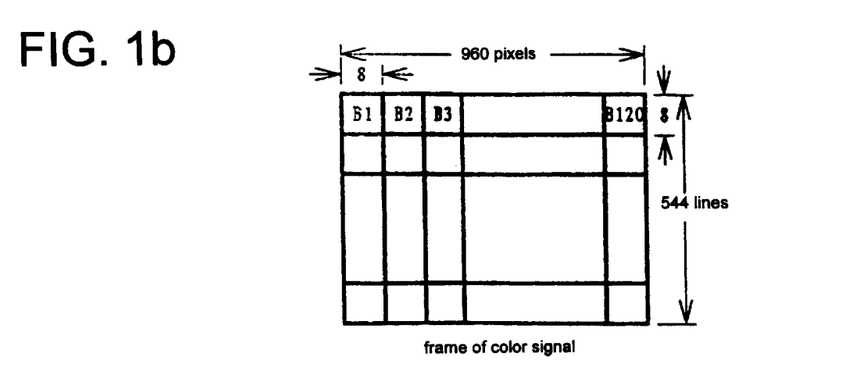
Figure 1C:
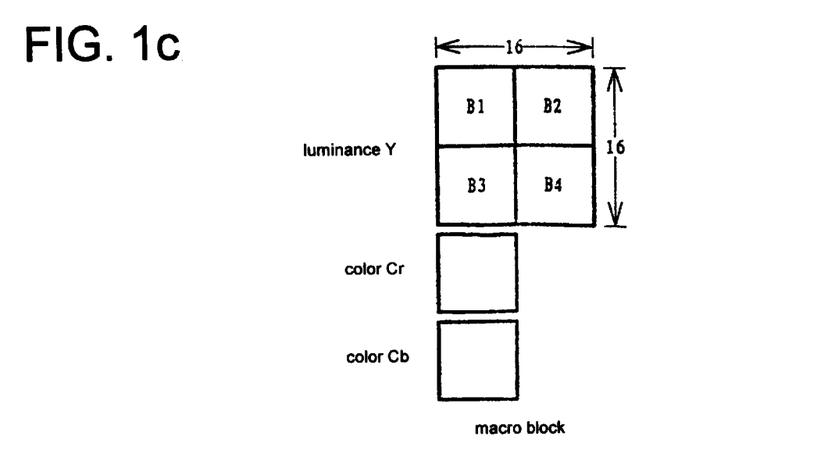

As shown in FIG. 1a, video data with luminance and color signals is decoded in the unit of macro blocks, each of which is composed of four blocks. Each block is composed of 8 pixels×8 pixels, and each macro block is composed of 16 pixels×16 pixels. The luminance signal of the video data is stored into the luminance signal memory unit 100 in response to a write signal from the luminance signal address controller 310 in the address control circuit 300, and the color signal of the video data is stored into the color signal memory unit 200 in response to a write signal from the color signal address controller 320 in the address control circuit 300.

Namely, when the enable signals EN from the luminance and color signal address controllers 310 and 320 in the address control circuit 300 are "1" (high) in logic, they signify the write signals. At this time, the first RAMs 111 in the luminance and color signal memory units 100 and 200 perform write operations. To the contrary, in the case where the enable signals EN from the luminance and color signal address controllers 310 and 320 are "0" (low) in logic, they signify read signals. In this case, the first RAMs 111 in the luminance and color signal memory units 100 and 200 perform read operations.

In more detail, the luminance signal components Ya, Yb, Yc and Yd of the video data are stored respectively into the first to fourth memories 110–140 in the luminance signal memory unit 100, and the color signal components Cbi and Cri of the video data are stored respectively into the fifth and sixth memories 210 and 220 in the color signal memory unit 200.

Figure 1D:
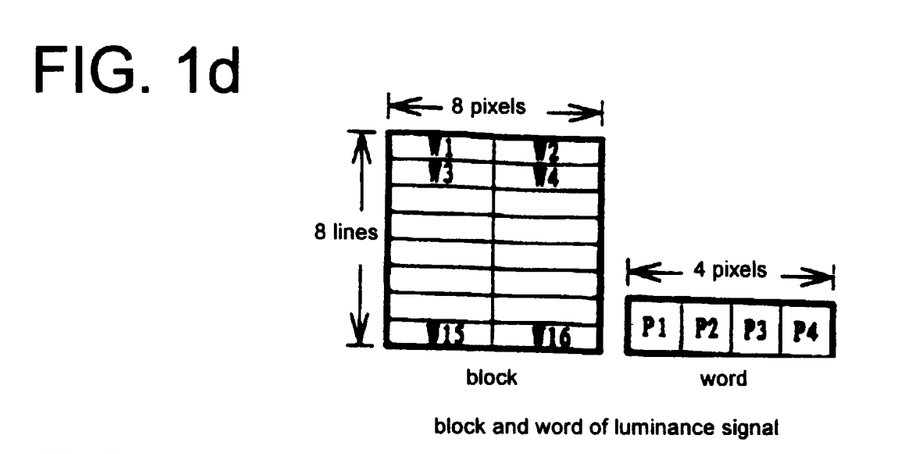

For example, the luminance signal components are stored into the luminance signal memory unit 110 in the order of block 1→block 2→block 3→block 4. Each block is composed of 16 words, as shown in FIG. 1d, which are stored in the order of word 1→word 2→word 3→. . .→word 15→word 16. Also, as shown in FIG. 1d, each word is composed of 4 pixels.

Figure 1E:
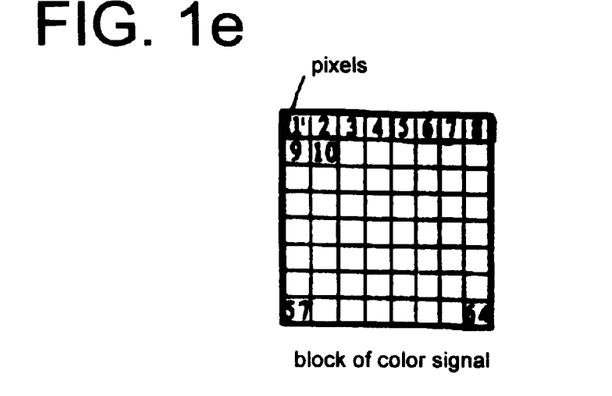

While one word of the luminance signal block shown in FIG. 1d is stored into the luminance signal memory unit 100, one pixel of the color signal block shown in FIG. 1e is stored into the color signal memory unit 200.

Figure 2A:
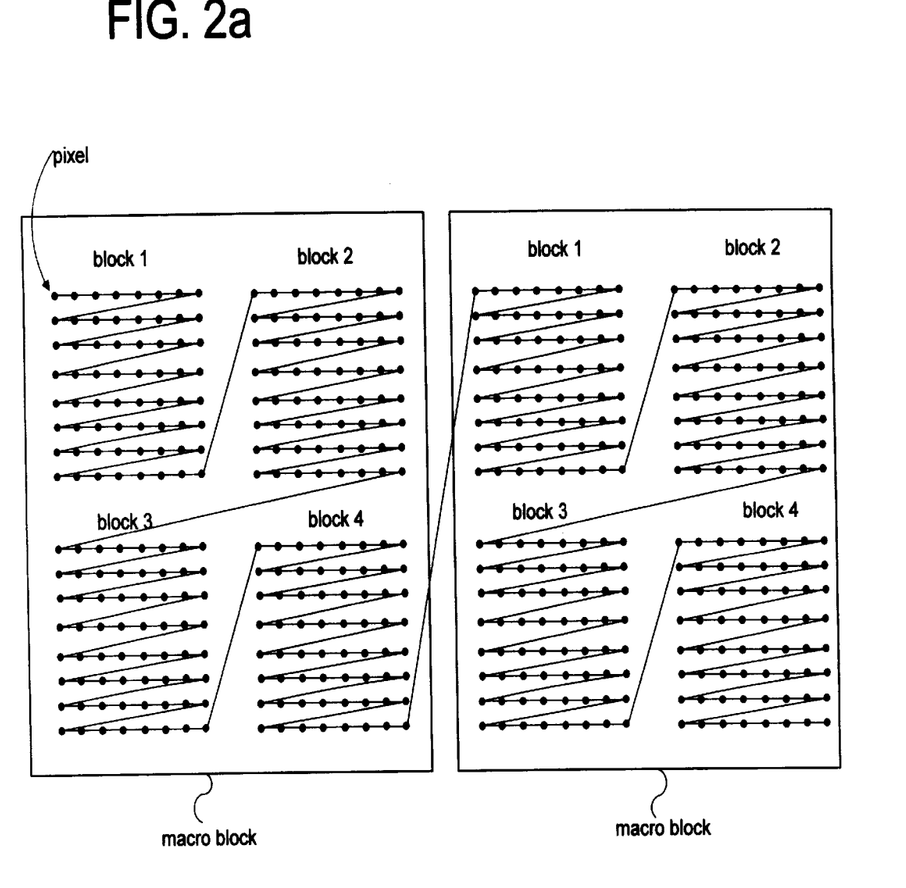
FIGS. 2a and 2b are views illustrating data read/write operations in accordance with the present invention.

As shown in FIG. 2a, the luminance and color signals are written respectively into the luminance and color signal memory units 100 and 200 in the unit of blocks.

Figure 2B:
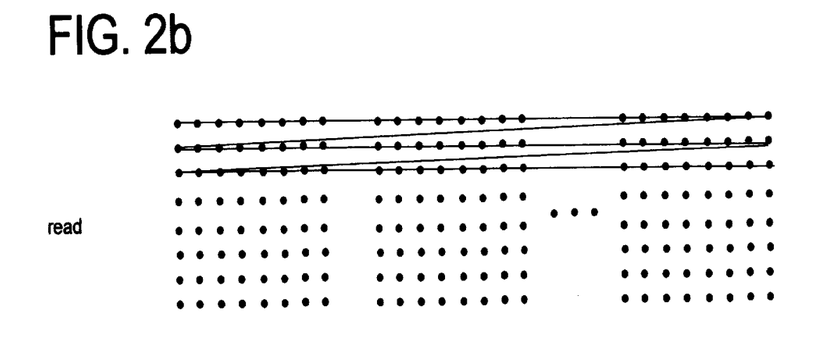

On the other hand, in the case where the enable signals EN from the luminance and color signal address controllers 310 and 320 in the address control circuit 300 are "0" (low) in logic, namely, they signify the read signals, the first RAMs 111 in the luminance and color signal memory units 100 and 200 perform the read operations. In this case, the luminance signal components stored in the luminance signal memory unit 100 are read in the order as shown in FIG. 2b. Then, the multiplexing circuit 400 converts a 4-byte luminance signal from the luminance signal memory unit 100 into a 2-byte luminance signal of odd and even luminance signal components Yo and Ye so that it can be displayed on a CRT.

Then, in the case where the enable signals EN from the luminance and color signal address controllers 310 and 320 in the address control circuit 300 are "1" (high) in logic, namely, they signify the write signals, the second RAMs 112 in the luminance and color signal memory units 100 and 200 perform the write operations.

As mentioned above, the first and second RAMs 111 and 112 in the luminance and color signal memory units 100 and 200 alternately perform the read/write operations in response to the read/write signals from the luminance and color signal address controllers 310 and 320. A vertical interpolation operation is performed by executing the write operation of the color signal memory unit 200 in the unit of bytes and repeating the read operation thereof twice according to the same addressing as the luminance signal memory unit 100.

In the alternative embodiment of the luminance and color signal memory units 100 and 200, the first and second dual port RAMs 113 and 114 alternately perform the read/write operations in the same manner as the first embodiment. Namely, while the first dual port RAM 113 performs the read operation, the second dual port RAM 114 performs the write operation.

Then, the read color signal components Cbi and Cri from the color signal memory unit 200 are applied to the interpolator 500. In the interpolator 500, the color signal components Cbi and Cri are stored respectively into the FIFO memories in response to the write enable signal WEN and then read therefrom in response to the read enable signal REN. As a result, the compressed color data is expanded into the original state, and the vertical components thereof are interpolated.

On the other hand, the luminance signal components Ye and Yo of the 2-byte luminance signal from the multiplexing circuit 400 are delayed respectively by the D flip-flops 410 and 411 and then applied to the digital interface unit 600, which also receives the color signal components Cbi and Cri from the interpolator 500. In the digital interface unit 600, the ECL/TTL converter 670 performs an ECL/TTL conversion operation with respect to the external clock signal B to generate the final clock signal CK. Then, the ECL/TTL converter 670 applies the clock signal CK to the first and second ECL multiplexers 650 and 660 to control the output of the final luminance and color signals Y and C therefrom.

As shown in FIG. 10, the luminance signal component Ye is latched by the first D flip-flop 610 and then applied to the first ECL multiplexer 650. The luminance signal component Yo is latched by the second D flip-flop 620 and then applied to the first ECL multiplexer 650. The first ECL multiplexer 650 performs TTL/ECL conversion and multiplexing operations with respect to the luminance signal components Yeq and Yoq latched respectively by the first and second D flip-flops 610 and 620 in response to the final clock signal CK from the ECL/TTL converter 670 to generate the final luminance signal Y.

The color signal component Cbi is latched by the third D flip-flop 630 and then applied to the second ECL multiplexer 660. The color signal component Cri is latched by the fourth D flip-flop 640 and then applied to the second ECL multiplexer 660. The second ECL multiplexer 660 performs TTL/ECL conversion and multiplexing operations with respect to the color signal components Cbi and Cri latched respectively by the third and fourth D flip-flops 630 and 640 in response to the final clock signal CK from the ECL/TTL converter 670 to generate the final color signal C. As a result, the luminance and color signals Y and C of the ECL level are outputted in the scanning line order.

As apparent from the above description, according to the present invention, the decoded video data, which cannot be scanned directly on the CRT, is converted in the scanning line order so that it can be displayed on the CRT. Further, every four of the pixels are processed in the parallel manner at a time. Therefore, hardware can be simply designed and readily configured.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for converting a video signal in the scanning line order, comprising:

video signal conversion means for converting decoded video data to scan it directly on a CRT;

frame rate conversion means for converting a frame rate of output data from said video signal conversion means in response to syntax data indicative of a vertical size, horizontal size, frame rate code and scanning format of the video data required by the MPEG; and interface means for performing an interfacing operation with respect to output data from said frame rate conversion means;

wherein said video signal conversion means includes:

address control means for performing an address control operation in response to a synchronous signal and a first clock signal;

luminance signal memory means for storing and outputting first to fourth luminance signal components of said video data under the control of said address control means;

color signal memory means for storing and outputting first and second color signal components of said video data under the control of said address control means;

multiplexing means for multiplexing said first to fourth luminance signal components outputted from said luminance signal memory means;

interpolation means for delaying said first and second color signal components outputted from said color signal memory means for a predetermined time period;

first and second flip-flop means for buffering fifth and sixth luminance signal components outputted from said multiplexing means respectively; and digital interface means for interfacing said fifth and sixth luminance signal components buffered respectively by said first and second flip-flop means with said first and second color signal components delayed by said interpolation means in response to a second clock signal to output the final luminance signal, the final color signal and the final clock signal.

2. An apparatus for converting a video signal in the scanning line order, as set forth in claim 1, wherein said video signal conversion means is adapted to parallel-process said video data in the unit of four pixels at 33 MHz.

3. An apparatus for converting a video signal in the scanning line order, as set forth in claim 1, wherein said address control means includes:

a luminance signal address controller for controlling the addressing of said luminance signal memory means in response to said synchronous signal and said first clock signal; and a color signal address controller for controlling the addressing of said color signal memory means in response to said synchronous signal and said first clock signal.

4. An apparatus for converting a video signal in the scanning line order, as set forth in claim 3, wherein said color signal memory means includes:

a first memory for storing and outputting said first color signal component under the control of said color signal address controller; and a second memory for storing and outputting said second color signal component under the control of said color signal address controller.

5. An apparatus for converting a video signal in the scanning line order, as set forth in claim 3, wherein said luminance signal memory means includes:

a first memory for storing and outputting said first luminance signal component under the control of said luminance signal address controller;

a second memory for storing and outputting said second luminance signal component under the control of said luminance signal address controller;

a third memory for storing and outputting said third luminance signal component under the control of said luminance signal address controller; and a fourth memory for storing and outputting said fourth luminance signal component under the control of said luminance signal address controller.

6. An apparatus for converting a video signal in the scanning line order, as set forth in claim 5, wherein said multiplexing means includes:

a first multiplexer for multiplexing said first luminance signal component outputted from said first memory and said third luminance signal component outputted from said third memory to output said fifth luminance signal component; and a second multiplexer for multiplexing said second luminance signal component outputted from said second memory and said fourth luminance signal component outputted from said fourth memory to output said sixth luminance signal component.

7. An apparatus for converting a video signal in the scanning line order, as set forth in claim 5, wherein each of said first to fourth memories includes:

first and second RAMs for storing and outputting a corresponding one of said first to fourth luminance signal components;

first and second 3-state gates for transferring read/write addresses from said luminance signal address controller to said first RAM in response to an enable signal from said luminance signal address controller;

third and fourth 3-state gates for transferring said read/write addresses from said luminance signal address controller to said second RAM in response to said enable signal;

fifth and sixth 3-state gates for controlling data input/output operations of said first RAM in response to said enable signal; and seventh and eighth 3-state gates for controlling data input/output operations of said second RAM in response to said enable signal.

8. An apparatus for converting a video signal in the scanning line order, as set forth in claim 1, wherein said interpolation means includes:

a first FIFO memory for outputting said first color signal component from said color signal memory means in response to a read enable signal;

a second FIFO memory for storing said first color signal component from said color signal memory means in response to a write enable signal;

a third FIFO memory for outputting said second color signal component from said color signal memory means in response to said read enable signal; and a fourth FIFO memory for storing said second color signal component from said color signal memory means in response to said write enable signal.

9. An apparatus for converting a video signal in the scanning line order, as set forth in claim 1, wherein said digital interface means includes:

a first D flip-flop for delaying said fifth luminance signal component buffered by said first flip-flop means in response to said second clock signal;

a second D flip-flop for delaying said sixth luminance signal component buffered by said second flip-flop means in response to said second clock signal;

a third D flip-flop for delaying said first color signal component from said interpolation means in response to said second clock signal;

a fourth D flip-flop for delaying said second color signal component from said interpolation means in response to said second clock signal;

a first ECL multiplexer for performing TTL/ECL conversion and multiplexing operations with respect to said fifth and sixth luminance signal components delayed respectively by said first and second D flip-flops in response to said final clock signal to generate said final luminance signal;

a second ECL multiplexer for performing TTL/ECL conversion and multiplexing operations with respect to said first and second color signal components delayed respectively by said third and fourth D flip-flops in response to said final clock signal to generate said final color signal; and an ECL/TTL converter for performing an ECL/TTL conversion operation with respect to said second clock signal to generate said final clock signal and applying it to said first and second ECL multiplexers.

10. A method for converting a video signal in the scanning line order, comprising the steps of:

(a) storing luminance and color signals of decoded video data into luminance and color signal memory units, respectively;

(b) parallel-multiplexing said luminance signal from said luminance signal memory unit;

(c) parallel-latching said color signal from said color signal memory unit; and (d) interfacing the multiplexed luminance signal with the multiplexed color signal to scan said video data on a CRT in the scanning line order.

11. A method for converting a video signal in the scanning line order, as set forth in claim 10, wherein said step (b) includes the step of multiplexing said luminance signal from said luminance signal memory unit in the unit of 4 bytes and said color signal from said color signal memory unit in the unit of 2 bytes.

12. A method for converting a video signal in the scanning line order, as set forth in claim 10, wherein said step (a) includes the step of performing a bidirectional input/output control operation.

13. A method for converting a video signal in the scanning line order, as set forth in claim 10, wherein said step (a) includes the step of storing one pixel of said color signal for one clock period where one word of said luminance signal is stored.

14. A method for converting a video signal in the scanning line order, as set forth in claim 10, wherein said step (a) includes the step of storing luminance and color signals from a motion compensator in the unit of slices.

15. A method for converting a video signal in the scanning line order, as set forth in claim 10, wherein said step (b) includes the step of converting a 4-byte luminance signal from said luminance signal memory unit into a 2-byte luminance signal of odd and even luminance signal components.

16. A method for converting a video signal in the scanning line order, as set forth in claim 10, wherein a vertical interpolation operation is performed by executing a write operation of said color signal memory unit in the unit of bytes and repeating a read operation thereof twice according to the same addressing as said luminance signal memory unit.

* * * * *